March 17, 1942.   A. H. BOEHMER   2,276,819
ALIGNING FIXTURE
Filed Dec. 26, 1939

INVENTOR.
ALEXANDER H. BOEHMER
BY *J. H. B. Whitfield*
ATTORNEY.

Patented Mar. 17, 1942

2,276,819

UNITED STATES PATENT OFFICE 2,276,819

ALIGNING FIXTURE

Alexander H. Boehmer, Park Ridge, Ill., assignor to Teletype Corporation, Chicago, Ill., a corporation of Delaware Application December 26, 1939, Serial No. 310,957

1 Claim. (Cl. 77—55)

The present invention relates to fixtures and more particularly to holding or rigidifying apparatus which is adaptable for use in conjunction with power driven rotary spindle machines.

Under existing production methods of operation, small and medium sized piece parts are frequently held in alignment fixtures to insure the proper support of the piece parts for drill press operation or similar machining. Frequently supporting fixtures of this type comprise supporting blocks which are accurately surfaced to rest upon a drill press bed but which receive no additional support to resist; for example, the torsional influence of a rotary spindle as it engages the work. Thus, while a piece part may itself be supported securely within a fixture for insuring the proper alignment thereof, there may be some hazard incident to rotary spindle operations which can give rise to such dangers as wrenching the holding fixture and work from the operator's hand, breaking of the drill bit, and the hurling of the rotating mass from the machine bed at the risk of injury to the machine operator or of unprotected persons and objects in the vicinity.

To obviate such a possibility, preventative means have been proposed, the object of which is to retain small and medium sized piece parts with or without supporting fixtures during the process of machining operations so as to prevent the hazards incident to centrifugally influencing forces and other dangers.

For a more comprehensive understanding of the principles and application of the present invention, reference will now be had to the accompanying drawing and to the detailed specification following, in both of which like reference characters have been employed to designate corresponding parts throughout and, in which Fig. 1 is a perspective view of a processing machine table disposed beneath a rotary spindle with associated drill and chuck, and having applied thereto an apparatus embodying the principles of the present invention;

The processing bed 11 consists of a rigid table with an integrally formed moat 12 surrounding it and providing a trough for catching the overflow of cooling fluid as it runs from the point of application, near the piece part, and is permitted to accumulate and be returned again for service in cooling the work. That portion of the machine which treats of the conserving and reusing of the cooling fluid forms no part of the present invention save that the retaining walls 13 of the troughs 12 are utilized for the purpose of support, as will be indicated hereinafter.

Figure 4:
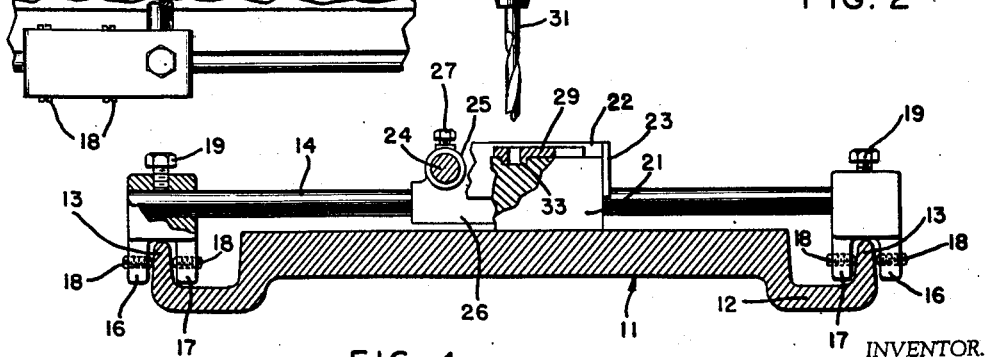
Fig. 4 is a transverse vertical section with certain portions of the improved apparatus broken away to reveal structural details thereof.

A main supporting beam 14 of cylindrical cross-section is itself anchored at its ends in a pair of standards 15, each of which is equipped with a saddle portion consisting of two side walls 16 and 17 which straddle the perimetric moat wall 13, and through which pass the set screws 18, as best indicated in Fig. 4. To anchor securely the main beam 14, the standard provides additionally the vertically disposed cap screws 19 which are threaded into the body of the standards 15 and are provided with penetration points for binding the beam 14. To adjust the assembly thus far described longitudinally of the bed plate 11, one need but release the set screws 18 which extend through the outer walls 16 in addition to loosening either one of the beam securing cap screws 19.

Figure 1:
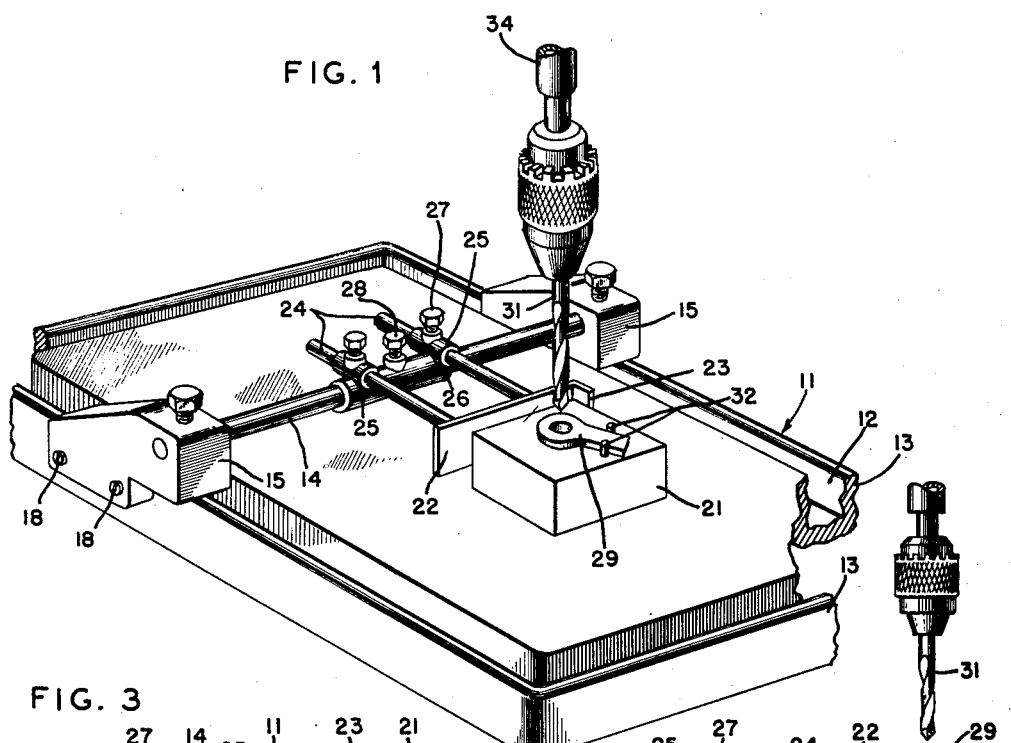

A supporting wall 22 is rigidly secured, as by welding, to a pair of parallel guide and supporting rods 24 which, extending as they do from the wall 22, are received within closely fitting sleeves 25, which elements, in turn, are integrally associated with a transverse sleeve 26. The assembly of sleeves 25 and 26 constitute an anchorage clamp, as best portrayed in Fig. 1.

In the illustrated embodiment, there is contemplated the use of rectangular piece part supporting fixtures 21, it being taken for granted that where other fixtures are employed, or where piece parts are not of rectangular conformation, appropriate patterning of the supporting wall 22 may be had. As illustrated, the latter member consists merely of a short wall section 22 with a right angularly arranged extension wall 23.

A pair of cap screws 27, which extend through the intermediate boss sections in the sleeves 25, serve to bind the rods 24 after predetermined settings are attained while the single cap screw 28, passing through a boss in the larger sleeve 26, correspondingly secures the latter against longitudinal displacement on the main beam 14.

Figures 2, 3:
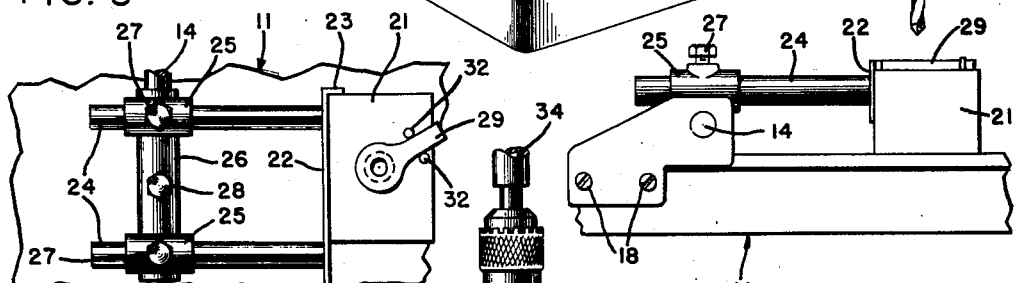
Fig. 2 is a side elevation of a portion of the apparatus illuminated in Fig. 1.
Fig. 3 is a fragmentary plan view of a portion of the apparatus illustrated in Fig. 1.

When an adjustment has been once established, as indicated in Fig. 3, with the supporting fixture 21 disposed so that the piece part 29 is properly aligned beneath the drill bit 31, it will be observed that the wall sections 22 and 23 will act to prevent rotation or the tendency to rotate on the part of fixture 21, as influenced by and in the direction of the movement of the machining tool 31. It is understood that any piece part, such as the one arbitrarily illustrated 29 which is unable to lie on the operating bed securely and rigidly, is confined against displacement with respect to the fixture 21 in any suitable manner, such as by means of the guide pins 32, and the fixture recess 33, Fig. 4, which receives an embossment lug formed at the lower face of the work piece 29.

To accommodate for variations in the dimension of fixtures or in the location of a drill spindle 34 with respect to the bed 11, suitable adjustment may be made by longitudinal movement and subsequent securement of the main beam 14, the adjustment on the main beam of the anchorage clamp sleeve 26, and finally by the relative adjustment of the parallel rods or auxiliary beams 24 with respect to their associated anchorage clamp sleeves 25.

While the present invention has been explained and illustrated in contemplation of a more or less specific embodiment, it will be understood, nevertheless, that numerous changes and modifications may be made without departing from the fundamental essentials of the invention. Accordingly, it is intended not to be restricted by the specific details described in the foregoing specification nor those illustrated in the accompanying drawing, except as indicated in the hereunto appended claim.

What is claimed is:

In combination with a vertical spindle machining apparatus having a horizontal bed and perimetric defining walls integrally formed with said bed, a main beam including clamping elements having portions for straddling said defining walls, an anchorage clamp comprising a sleeve fitted on said main beam and auxiliary sleeves integrally formed having openings transversely of said main beam, a pair of auxiliary beams receivable in said transverse sleeves of said anchorage means, securement screws for rigidifying each element of said main and auxiliary beams with respect to said anchorage clamp, and a fixture supporting member integrally formed with said auxiliary beams.

ALEXANDER H. BOEHMER.